Sept. 13, 1938.     O. H. MILMORE     2,130,147
PROCESS FOR SEPARATING HIGH MOLECULAR MIXTURES
Filed Dec. 9, 1935
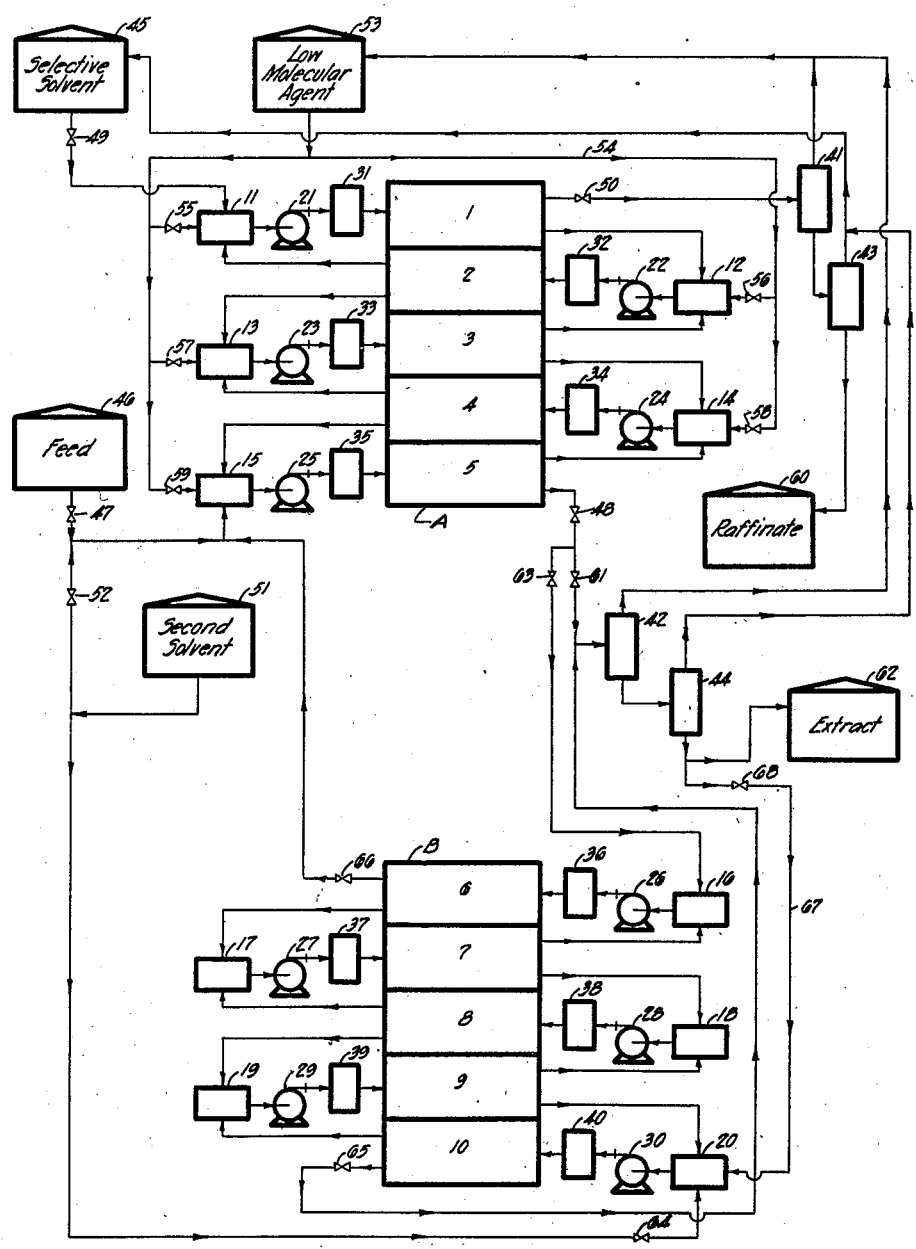
Oswald H. Milmore
Inventor:

Patented Sept. 13, 1938

2,130,147

UNITED STATES PATENT OFFICE 2,130,147

PROCESS FOR SEPARATING HIGH MOLECULAR MIXTURES

Oswald H. Milmore, Berkeley, Calif., assignor to Shell Development Company, San Francisco, Calif., a corporation of Delaware Application December 9, 1935, Serial No. 53,585

14 Claims. (Cl. 196—13)

This invention relates to improvements in the method of separating mixtures of high molecular substances, such as petroleum oils, shale oils, oil fractions obtained by distillation of crude oils, shale oils, coal tar oils, animal oils, and vegetable oils, into fractions having different chemical and/or physical properties, with the aid of liquid selective solvents. The initial mixture to be separated must be in the liquid state, either by being normally liquid at the temperature and pressure of the treatment, or by being dissolved in a suitable solvent.

It is known to extract one component or a group of components of a liquid mixture by means of one or more solvents which are capable of forming two liquid phases when contacted with the mixture. Thus, it has been proposed to separate petroleum oils into a paraffinic raffinate and an aromatic or naphthenic extract by flowing a selective solvent for naphthenic or aromatic hydrocarbons, such as liquid sulfur dioxide or ethyl alcohol through a countercurrent treater, countercurrently to the oil, and flowing a second solvent, such as propane, which is capable of forming two liquid phases when contacted with the extract phase produced by the selective solvent, countercurrently to the extract phase, to remove from it certain paraffinic hydrocarbons which it is desired to recover with the raffinate phase, the solution of the propane and the recovered paraffinic hydrocarbons being introduced into the portion of the treater in which the fresh oil is introduced. Since the presence of the propane is generally undesirable in that portion of the treater at which the fresh selective solvent is contacted with the raffinate phase, it has been proposed to withdraw the raffinate phase at one or more points in the countercurrent treater to remove all or a portion of the propane from it, and to reintroduce the residual portion of the withdrawn raffinate phase into the treater.

It is also known to treat petroleum hydrocarbons with strong mineral acids, such as sulfuric acid, to eliminate objectionable sulfur compounds, asphaltic and dark colored substances, olefines and aromatics. This operation may be carried out in a countercurrent manner, whereby the fresh acid is contacted with the nearly finished oil. As an improvement on this process, it has been proposed to treat the oil in the presence of a low boiling liquid or liquefied paraffinic hydrocarbon, such as propane, to lower the viscosity of the oil and to aid the acid in dissolving the undesirable constituents.

In both of the above types of extractions, it has been proposed to prevent channeling of the counterflowing streams in packed columns, and to insure more intimate contact chambers, by bubbling an inert gas, such as nitrogen, through the mixture of oil and solvent, the term solvent being herein used to include both, the chemically inert selective solvents of the type of BB' dichloroethyl ether and chemically active acids. This gas, however, is employed at relatively low pressures, and substantially no gas is dissolved in the oil.

It is an object of the present invention to provide an improved process for separating such high molecular mixtures in countercurrent operations, employing liquid selective solvents, to improve the sharpness of the separation, as indicated, for example, by the quality of the raffinate phase and/or the extract phase, or by the yield of a raffinate of a given quality or composition. A further object is to improve the quality of the raffinate phase produced by liquid selective solvent extraction processes by treating the raffinate phase in the extraction zone with a low molecular substance under a pressure sufficient to dissolve an appreciable quantity thereof in the raffinate phase, at a temperature near its critical temperature to separate certain constituents of the raffinate, and treating additional quantities of the high molecular mixture in the presence of the separated constituents. A still further object is to provide a process in which the same solvent may be employed to improve the quality of the extract phase and, under different conditions, to improve the quality of the raffinate phase. Other objects of my invention will be apparent from a reading of the following specification, together with the drawing forming a part thereof, which illustrates one form of an apparatus suitable for practicing certain preferred embodiments of my invention, it being understood that my invention is not limited to the specific form of apparatus shown therein.

Briefly, my invention comprises the steps of extracting a liquid high molecular mixture containing at least two components having different internal pressures in one region of an extraction zone with a liquid selective solvent for a component having a greater internal pressure than at least one other component, under conditions at which the selective solvent is in a normal liquid state, causing the formation of liquid extract and raffinate phases, and treating the resulting raffinate phase, either in contact with an extract phase, or separately in another region of the extraction zone, with a low molecular treating agent in the para-critical state, i. e., near to or above its critical temperature, and at a pressure at which enough of the low molecular agent is dissolved in the raffinate phase to effect a lowering of its density to render those components of the mixture which have relatively high internal pressures to become insoluble in the raffinate phase and pass from the raffinate phase into an isotonic extract phase, or to separate out of the raffinate into a separate phase. The treatment with the low molecular agent in its para-critical state may be effected in the presence or in the absence of selective solvent; and the treatment with the selective solvent is preferably carried out at temperatures which are below the para-critical temperature of the low molecular treating agent, or under conditions at which this agent is either absent or present in minor proportions, insufficient to cause the separation of the mixture into two phases in the absence of the selective solvent. The material which is thus separated from the raffinate phase is returned to the region of the extraction zone where the mixture is being treated with the selective solvent. The phases produced in these operations may be separated by any physical means, without changing their compositions, such as settling or centrifuging, and the final phases withdrawn from the process may be separately treated to remove the solvent and treating agent therefrom. The process is preferably carried out in a continuous countercurrent manner, as will be described more completely hereinafter, although it is possible to employ semi-continuous methods, or it may be carried out by the method of multiple extractions, the material removed from the raffinate phase, or a portion thereof, being returned to the stages at which the mixture is treated with a selective solvent.

By combining the multiple or countercurrent extraction process with the treatment employing a low molecular substance in the para-critical state in this manner, it is possible to obtain a far more complete separation of the components of the mixture, and to produce products of greater purity, than is possible when either treatment is employed alone, because the low molecular agent is used, according to my invention, just in the stage of the extraction where the refining action of the solvent is greatly limited by its low solvent power for the concentrate of the poorly soluble (raffinate) components reaching this stage. This solvent power has heretofore been increased by raising the temperature, or by adding solubility enhancing agents; but these expedients often result in a markedly lowered selectivity. The precipitating action of the low molecular treating agent with regard to substances preferentially soluble in the selective solvent being additive with the selective dissolving action of the solvent, enables me to produce the effect of a high solvent power while yet preserving a high degree of selectivity.

The selective solvent is usually employed at a temperature which is below its critical miscibility temperature, (i. e., the temperature above which the selective solvent is incapable of forming two liquid phases with the high molecular mixture, or with a component thereof, in the absence of the low molecular treating agent) and in such concentrations that it will form two liquid phases with the high molecular mixture in the absence of the low molecular treating agent. It is, however, also possible to employ lesser quantities of the selective solvent dissolved in the mixture than are required to form two phases when in that region of the extracting zone at which it is treated with the low molecular agent at its para-critical conditions; or the temperature of operation in this portion of the extraction zone may be above the critical miscibility temperature of the selective solvent. In these two situations, the low molecular agent is used in sufficient quantities to cause the formation of at least two liquid phases, the presence of the selective solvent being inducive to the separation of the mixture into phases of the desired compositions.

Any selective solvent which is a preferential solvent for a component of the initial mixture which has a higher internal pressure than at least one other component may be employed. In multi-stage operations, in those stages where the low molecular treating agent is not employed under para-critical conditions, the selective solvent must be capable of forming two liquid phases with the mixture, if desired, with the aid of a second solvent, and its critical miscibility temperature with the least soluble component of the mixture should preferably be not more than about 100° C. below the temperature prevailing in the stage or stages where the treating agent is employed under conditions of low internal pressure. Examples of such selective solvent, which may be used to extract the naphthenic or aromatic components from hydrocarbon oils, are: BB' dichloroethyl ether, aniline, quinoline, and any other similar solvent. At higher temperatures, the following are preferred: ethylene diamine, di- and tri-ethanol amines, formic acid, and acetic anhydride. Such chemically inert solvents are for convenience designated in the claims as "solvents of the type of BB' dichloroethyl ether", to distinguish them from acids and other types of solvent. The solvents recited in the last group are particularly suitable when employed with such low molecular treating agents as pentane and hexane. Strong mineral acids, such as sulfuric acid, may also be employed in my process, and its effectiveness in removing the undesirable constituents is improved by the use of a low molecular treating agent under the conditions described in the specification. Thus, in the acid treatment of mineral oils, the formation of pepper sludge will be largely prevented, resulting in the production of a more desirable product than obtainable without the use of a low-molecular treating agent.

The temperature at which the raffinate phase is treated is selected so that the low molecular agent has a low internal pressure, i. e. an internal pressure of the order of that of gases. Such internal pressures are obtained by maintaining the treating agent, preferably in the vicinity of or above its critical temperature. Such temperatures are in the present specification and claims designated as "para-critical".

The solubility of the low molecular treating agent may often be increased by dissolving the high molecular mixture in a suitable low internal pressure solvent, which has a higher critical temperature and/or a lower vapor pressure than the low molecular agent, whereby the solvent is liquid under the conditions of the treatment. This solvent may, for example, be a low boiling liquid or liquefied aliphatic hydrocarbon of the type commonly known as deasphalting agents, such as propane, butane, pentane, hexane, heptane, etc., and their corresponding olefines. For example, when propane is used as the low molecular treating agent, pentane or a higher boiling hydrocarbon may be employed as the liquid solvent. A low molecular treating agent is regarded as being in the para-critical state when at a temperature above its temperature of maximum solubility for the high molecular mixture being treated, i. e., the temperature above which a rise in the temperature of the low molecular substance under its own vapor pressure is accompanied by a decrease in its solvent power for the high molecular mixture. For example, up to about 55° C., the solvent power of liquid propane for a certain lubricating oil fraction was found to increase with a rise in temperature under the vapor pressure of propane; but above this point a further rise in temperature was accompanied with a reduction in its solvent power. I must, therefore, operate my process above 55° C., if propane is employed for treating this oil. In practice, I prefer to employ temperatures at least 15° C. above this maximum solubility temperature. Thus, for propane, I prefer to operate above 70° C. This lower limit of the preferred range is, however, often below the phase point of the low molecular agent with the high molecular mixture, which, with the oil referred to, is about 80° C., the phase point being defined as the lowest temperature at which phase separation occurs with the low molecular agent and the mixture, in the absence of selective solvents.

Other examples of lower useful temperature range limits, which are about 20 to 40° C. below the critical temperature of the low molecular substance, may be readily determined by those skilled in the art, and will vary somewhat with the composition of the high molecular mixture being treated. The following are typical: ethane, acetylene, and carbon dioxide, about 0° C.; ethylene, about −25° C.; normal and iso-butane, about 100–120° C.

Liquids which have temperatures below para-critical are in the present specification and claims designated as "normal liquids".

Any low molecular substance which is capable of being dissolved in the high molecular mixture being separated, or in its solution in a suitable solvent, in an effective quantity to cause the lowering of its density and/or its internal pressure may be employed. Since the process is preferably carried out at temperatures in the proximity of and above the critical temperatures of the gaseous treating agents, it is necessary to select a substance having a low enough critical temperature so that the temperature of operation is not inconveniently high, will not cause the decomposition of the high molecular substances, and will not be so high as to prevent the formation of two phases, since a rise in temperature generally is accompanied with a corresponding increase in the miscibility of the components of the high molecular mixture. The maximum operative temperature will depend upon the nature of the high molecular mixture as well as upon the properties of the treating agent. In view of these requirements, I prefer when treating hydrocarbon oils, to employ low molecular substances having critical temperatures low enough to be employed at temperatures below about 200° C. The preferred group of low molecular substances, particularly for treating many organic mixtures, such as petroleum products, vegetable oils, etc., consists of aliphatic hydrocarbons having between one and six carbon atoms in the molecule, such as methane, ethane, ethylene, propane, propylene, acetylene, normal- or iso-butane, pentanes and hexanes, etc., although aliphatic substances having as many as eight carbon atoms may in certain cases be employed. Among other gases which may be employed as low molecular treating agents, the following may be mentioned, without, however, restricting the scope of the invention thereto: hydrogen, carbon dioxide, carbon monoxide, water gas, dry natural gas, natural gas, sulfur dioxide, sulfur trioxide, ammonia, ethyl chloride, dichlor-difluor methane, methylene fluoride, dimethyl ether, methyl ethyl ether, dimethyl amine, hydrogen chloride, and rare gases, such as helium. The treating agent should, preferably, be incapable of reacting chemically with the high molecular substances under the conditions of the treatment, no chemical change being contemplated in the treatment.

The pressure must be sufficiently great to dissolve an effective quantity of the low molecular treating agent in the initial mixture, or in the raffinate phase and may be varied between successive stages of the process, as will be more fully described below. The lowest concentration of the treating agent which is normally sufficient to cause an appreciable improvement in the compositions of the raffinate and extract phases is about 40% by weight, and I generally prefer to employ pressures high enough to dissolve at least 100%, and may dissolve as much as 800% or even more, depending upon the quantity of the selective solvent employed, upon the critical miscibility temperature and selectivity of the selective solvent and upon the nature of the initial mixture. However, when the treatment is carried out in the presence of a solvent which has a low internal pressure, as described below, even smaller quantities, as low as 20% are often effective. The pressures will in most cases be between about 100 and 1500 lbs./sq. in. gauge, although I am not restricted to these pressures. At the pressures which are preferably employed, the portion of the low molecular substance which is not dissolved in the high molecular mixture is in the gaseous state, so that a gas phase may often be present in the system, in addition to the liquid raffinate and extract phases, but pressures sufficient to liquefy the low molecular agent may also be employed. It is desirable, particularly in the case of packed columns, in which the low molecular agent is introduced at a point from which it can bubble through the mixture of counterflowing extract and raffinate phases, to control the quantity of the low molecular treating agent to reduce the quantity of this undissolved gas to a minimum, whereby the countercurrent flow of the raffinate and extract phases will not be prevented; the presence of a small amount of this undissolved gas is, however, often desirable to prevent channeling, and to effect a mild agitation.

The invention will be more particularly described in connection with the drawing, which will be described with reference to a process for extracting a hydrocarbon oil, it being understood that the invention may be applied for extracting other types of mixtures. In the drawing, the extraction zone is represented by two countercurrent treaters, A and B comprising a number of settling chambers 1 to 10, mixers 11 to 20, pumps 21 to 30, and heat exchangers 31 to 40; 41 to 44 are separating devices, such as distilling units; 45 a tank for a selective solvent, such as BB' dichloroethyl ether, for the non-paraffinic hydrocarbons, and which is capable of forming an extract phase having a greater density than the raffinate phase, although solvents of low densities may also be employed; and 46 a tank for the oil to be extracted; all interconnected, as shown, and provided with gauges, safety valves, level control devices, heat exchangers, and other auxiliary equipment, not shown. The oil to be extracted is continuously supplied through a valve 47 to the mixer 15, and mixed with an extract phase withdrawn from the chamber 4; the resulting mixture is pumped through the heat exchanger 35, where it is brought to the desired temperature, into the settling chamber 5, where the mixture separates into two liquid phases, the raffinate phase being withdrawn through the upper outlet and fed into the mixer 14, the extract phase being withdrawn through a valve 48. The selective solvent is introduced into the mixer 11 through a valve 49 and flows countercurrently to the oil raffinate, the final raffinate being withdrawn at the top of the column through a valve 50. If desired, all stages may be operated at the same temperature, the heat exchangers being in this case sometimes unnecessary, although I prefer to operate the process so as to maintain a substantially uniform temperature gradient, the mixture flowing into the chamber 1 being the warmest, and the difference in temperature between adjacent chambers being, for example, about 5 to 10° C. Moreover, the temperature may be controlled by providing heating or cooling coils within the chambers. If desired, a second solvent, such as a low boiling paraffinic solvent, may be introduced from the tank 51 through a valve 52, and mixed with the oil.

To improve the sharpness of the separation, and to free the raffinate phase from components which it is desired to recover in the extract phase, a low molecular agent, in the para-critical state, is caused to be dissolved in the raffinate phase in effective quantities in one or more stages of the extraction zone nearest the point at which the raffinate is withdrawn from the extraction zone. This may be effected by several methods, a few of which will be described by way of illustration.

According to one method, a low molecular treating agent, in any state, but preferably in the gaseous state, is fed from a tank 53 through a manifold 54 and valves 55 to 59 to the chambers 1 to 5. If the agent is introduced at too low a temperature, the heat exchangers 31 to 35 will bring it to the para-critical state. The treating agent may, if desired, be first mixed with a small quantity of a mutual solvent, such as that in the tank 51, although when the second solvent is employed in the manner described above this solvent will be present in the raffinate phases withdrawn from the chambers 2 to 5, and the further addition of this solvent to the low molecular treating agent may be unnecessary. When a constant pressure prevails in the several chambers, and a constant temperature is maintained throughout the system, I prefer to add this treating agent only to the mixer 11 and/or 12. In this way the non-paraffinic hydrocarbons of the initial oil, which have relatively high internal pressures, but which remain dissolved in the raffinate phase, are caused to separate from the raffinate phase into the corresponding extract phase or solvent phase, thereby producing a raffinate phase of higher quality. This raffinate phase may be treated in the separator 41 to separate the low molecular treating agent, and in the separator 43 to separate the selective solvent, which are returned to their storage tanks, the raffinate phase being led to the storage tank 60. In this method only minor amounts of the low molecular agent are carried to the first stage 5 by the extract phases. The extract phase produced in this manner is withdrawn through a valve 61, similarly treated in the separator 42 and 44 and stored in the tank 62. If a second solvent is employed, further separators for its recovery may be provided.

As a modification of the above process, I may operate the chambers 5 to 1 at progressively increasing temperatures, whereby the temperature of the mixture introduced into the last stage will be high enough to cause the treating agent to be in a para-critical state; the temperature may often be somewhat above the critical temperature of the low molecular substance. The first stage 5 should preferably be considerably below the para-critical temperature. In this case I may introduce the low molecular treating agent into the mixer 15 or into all of the mixers. The quantity of the treating agent may be either equal to, greater than, or less than the amount which can be dissolved in the mixture at the pressure obtaining in the chambers into which it is introduced. The use of an excess may be desirable when operating with a packed column; but in the case of the mixers and settlers shown, it is preferred to avoid the formation of a gas phase in the chambers, although the treating agent may be incapable of being liquefied at the pressure of the treatment. When an excess of gas is employed, the upper outlets for the withdrawal of the raffinate phase may be spaced from the top of the chambers to insure the withdrawal of the liquid raffinate phases.

As another modification, the temperature may be maintained uniform throughout the stages 5 to 1, and the pressure increased progressively, whereby greater quantities of the treating agent are dissolved in the raffinate phases in successive stages. In this case, it is preferable to introduce the treating agent into each of the mixers 11 to 15, in quantities to cause substantially all of the introduced treating agent to be dissolved in the oil.

I may, moreover, subject the extract phase to a further treatment, by closing the valve 61 and opening the valve 63 to introduce the extract phase into the mixer 16. A second solvent, which is at least partially immiscible with the selective solvent at the temperature of the treatment and in the presence of the oil, is introduced into the mixer 20. The second solvent may be of the type of deasphalting agents, described above, and may be supplied from the tank 51 by closing the valve 52 and opening the valve 64. The extract phase is caused to flow countercurrently to this second solvent in the chambers 6 to 10, the washed extract phase being withdrawn through a valve 65 and treated in the separators 42 and 44. The intermediate raffinate phase which is produced in the chamber 6, may be withdrawn through a valve 66 and introduced into the mixer 15 together with the feed mixture. All or a portion of the second solvent may be separated from the intermediate raffinate phase before being fed into the mixer 15. The stages 6 to 10 may be operated at a suitable temperature gradient, so that the mixture in the chamber 10 is at the lowest temperature, and the mixture in the chamber 6 is at the highest temperature, which is preferably below the temperature in the chamber 5. Since most of the treating agent is carried to the subsequent stages with the raffinate phases, the concentration of this treating agent is progressively greater towards the last stage 1.

The selective solvent may, moreover, be introduced into a mixer, or into several mixers, other than 11, as for example, to mixer 12, in which case the concentration of the selective solvent in the chamber 1 will often be insufficient to cause the formation of two liquid phases in the absence of the low molecular agent, and the separation of the raffinate phase in the chamber 1 into raffinate and extract phases will be caused by the low molecular treating agent.

I may, moreover, employ in place of, or together with the second solvent from the tank 51, a portion of the final extract from the separator 44 for treating the extract phase in the extraction zone B, as by recycling a portion of the final product through the conduit 67 and the valve 68.

According to another method of introducing the low molecular agent into the last stage or stages of the process, the second solvent in the tank 51, supplied either through valve 52 or 64 is employed as the low molecular treating agent. This solvent is introduced into the settling chamber 10 at a temperature substantially below its maximum solubility temperature, whereby it is in its liquid state, and has a relatively high internal pressure. In the chamber 5 it may be present at any temperature, but preferably at a temperature below its maximum solubility temperature particularly when the extraction zone B is not employed. The raffinate phases, which are withdrawn from the several chambers of the extraction zone A, in this case, contain substantial amounts of this second solvent, and at least some of them are heated by flowing through the heat exchangers 31 to 34, so that the temperature in the chamber 1 is high enough to cause this second solvent to be in the para-critical state and have a low internal pressure, thereby aiding in the formation of a raffinate phase of an improved quality. A suitable pressure sufficient to retain an effective quantity of this second solvent in solution must, of course, be maintained. It should be noted that in this mode of operation the same solvent is employed under different conditions to perform two different functions: in the stages near the point of the withdrawal of the extract phase, (i. e., near the stage 5, or, when the zone B is employed, the stage 10) it acts as a liquid solvent and washes paraffinic oil components from the extract phase; in the stages near the point of withdrawal of the raffinate phase, (i. e., near the stage 1), it is no longer a liquid solvent, but acts as a precipitant, causing aromatic and naphthenic hydrocarbons to be thrown out of the raffinate phase and dissolved in the extract phase. If desired, the second solvent may consist of a mixture of the low molecular agent and a solvent which is a normal liquid; preferably the latter should have a lower internal pressure than the high molecular mixture.

According to still another method of operating the process, the necessary quantity of the low molecular treating agent is introduced into one of the first stages of the extraction zone A, such as the chamber 3, at a pressure sufficient to dissolve all of the agent, and at any desired temperature. The temperature is then increased in the subsequent stages 2 and 1, to cause the raffinate phase to expand, the pressure being maintained sufficiently high to prevent the formation of a gas phase. Under these conditions the non-paraffinic hydrocarbons become progressively less soluble in the raffinate phase towards the point at which it is withdrawn from the extraction zone. Alternatively, the agent may be introduced at a sufficiently high temperature to be in the para-critical state, but the pressure in the chamber into which it is introduced, e. g. 3, is so high that the overall density of the raffinate is not greatly changed. The pressure in the subsequent stages is then progressively lowered, permitting the raffinate phase to expand, and rendering the non-paraffinic hydrocarbons of high internal pressure progressively less soluble therein. The pressure may be reduced either at constant or increasing temperatures, and, if desired, adiabatically.

As further examples of mixtures of high molecular substances which can be fractionated by applying the process according to the present invention, may be mentioned mixtures of polymerized products, such as mixtures of polymerized olefines, polymerized fatty oils, e. g. volatilized rapeseed oil, and mixtures of substances obtained after separation of the asphaltenes from asphalt.

The molecular size necessary to characterize a mixture as "high molecular" depends upon the nature of the treating agent employed. In general, mineral oils heavier than kerosene, i. e., boiling above about 275° C. are regarded as being high molecular mixtures.

As used in the present specification and claims, the term "solution" is used to designate a substantially homogeneous phase, and the term "mixture" is used to designate any state of aggregation, whether homogeneous or heterogeneous. The term "component" is intended to include both pure substances and mixtures of substances having generally similar solvent characteristics in relation to a selective solvent. A component is said to be pure when it does not contain substances which should be present only in another component or fraction of the mixture. The term "gas" includes vapors.

I claim as my invention:

1. A process for separating a high molecular mixture into fractions having different properties, comprising the steps of subjecting said mixture in an extraction zone to the extractive action of a selective solvent for a component of the mixture which has a relatively higher internal pressure than another component, under conditions to produce liquid primary raffinate and extract phases, subjecting at least a portion of the raffinate in a normal liquid state to the precipitating action of a quantity of a low molecular treating agent which, under treating conditions, is incapable of reacting chemically with the high molecular mixture, under conditions of pressure and temperature at which said agent is in a para-critical state, said quantity being sufficient to cause the separation of the raffinate into secondary extract and raffinate phases, separating said secondary phases, and commingling the secondary extract phase with the extraction material in the extraction zone.

2. The process according to claim 1 in which the quantity of the low-molecular treating agent is at least 40% by weight of the raffinate treated.

3. The process according to claim 1 in which the raffinate is treated with the low-molecular agent in the presence of a normal liquid solvent of low internal pressure, and the quantity of the low-molecular treating agent is at least 20% by weight of the raffinate treated.

4. The process according to claim 1 in which the high molecular mixture is a hydrocarbon oil, the selective solvent is a chemically inert solvent of the type of BB' dichloroethyl ether, and the raffinate is treated with the low molecular agent in the presence of said selective solvent and at a temperature which is not higher than 100° C. above the critical miscibility temperature of the selective solvent with the most paraffinic components of the oil.

5. A process for separating a high molecular mixture into several fractions having different properties, comprising the steps of flowing said mixture in its normal liquid state in an extraction zone countercurrently to and in contact with a selective solvent for a component of the mixture having a relatively higher internal pressure than another component of the mixture under conditions causing the formation of liquid extract and raffinate phases, withdrawing said phases at different points in the extraction zone, and subjecting the raffinate phase in the extraction zone to the precipitating action of a quantity of a low molecular treating agent which, under treating conditions, is incapable of reacting chemically with the high molecular mixture, under conditions of temperature and pressure at which said agent is in the para-critical state, said quantity being at least 40% by weight of the raffinate phase treated.

6. The process according to claim 5 in which at least a portion of the solvent is introduced into the extraction zone near the point at which the raffinate phase is withdrawn from the extraction zone, and the temperature at which the raffinate phase is treated with the low molecular agent is not higher than 100° C. above the critical miscibility temperature of the solvent and the least soluble component of the mixture.

7. The process according to claim 5 in which at least a portion of the solvent is introduced into the extraction zone near the point at which the raffinate phase is withdrawn from the extraction zone, the temperature at which the raffinate phase is treated with the low-molecular agent is below the critical miscibility temperature of the solvent and the final raffinate phase, and the quantity of the solvent is sufficient to cause the formation of two liquid phases when contacted with said raffinate phase at the said temperature in the absence of the low-molecular treating agent.

8. A continuous process for separating a high molecular mixture into several fractions having different properties, comprising the steps of continuously flowing said mixture in a normal liquid state in a multi-stage extraction zone countercurrently to and in contact with a selective solvent for a component of the mixture having a relatively higher internal pressure than another component of the mixture under conditions causing the formation and countercurrent flow of liquid extract and raffinate phases, continuously withdrawing said phases at different points in the extraction zone, at least a portion of the solvent being introduced into the extraction zone near the point at which the raffinate phase is withdrawn, and introducing into a stage of the extraction zone near the point of withdrawal of the raffinate phase, a low-molecular treating agent which, under treating conditions, is incapable of reacting chemically with the high molecular mixture under conditions of temperature and pressure at which a quantity of said agent is dissolved in the raffinate phase in the para-critical state, said quantity being at least 40% by weight of the raffinate, the temperature at which said treating agent is dissolved in the raffinate phase being not higher than 100° C. above the critical miscibility temperature of the solvent with the least soluble component of the mixture.

9. The process according to claim 8 in which the low-molecular agent is introduced at a point in the extraction zone removed by at least one stage from the point of withdrawal of the raffinate phase, and the pressure on the raffinate phase is reduced as it flows from said point at which the agent is introduced towards the point of its withdrawal, whereby the density of the raffinate phase is lowered during said flow, the pressure being sufficient to prevent the formation of a gas phase in the last stage, from which the raffinate is withdrawn from the extraction zone.

10. A process for separating a high molecular mixture into several fractions having different properties, comprising the steps of subjecting the said mixture in an extraction zone to the action of two counterflowing solvents adapted to form separate layers when in contact with each other and with the mixture, the first of said solvents being a preferential solvent for a component of the mixture having a higher internal pressure than another component of the mixture, thereby forming counterflowing liquid extract and raffinate phases, said extract phase containing the said first solvent and a concentrate of the component preferentially soluble therein, withdrawing said phases at different points in the extraction zone, and subjecting the raffinate phase in a normal liquid state in a region of the extraction zone near its point of withdrawal to the precipitating action of a quantity of a low-molecular treating agent which, under treating conditions, is incapable of reacting chemically with the raffinate under conditions of pressure and temperature at which said agent is in a para-critical state, said quantity being at least 40% by weight of the raffinate phase.

11. The process according to claim 10 in which the second solvent is the low-molecular treating agent, and is introduced into the extraction zone at a temperature below its para-critical temperature.

12. A process for separating a high molecular mixture into several fractions having different properties, comprising the steps of subjecting the said mixture in an extraction zone to the action of two counterflowing solvents adapted to form separate layers when in contact with each other and with the mixture, the first of said solvents being a preferential solvent for a component of the mixture having a higher internal pressure than another component of the mixture, and the other solvent being a mixture of a liquid solvent for a component not preferentially dissolved in the first solvent and a low-molecular treating agent which, under the treating conditions, is incapable of reacting chemically with the high molecular mixture, thereby forming counterflowing liquid extract and raffinate phases, said extract phase containing the said first solvent and a concentrate of the component preferentially soluble therein, withdrawing said phases at different points in the extraction zone, and subjecting the raffinate phase in a normal liquid state in a region of the extraction zone near its point of withdrawal to the precipitating action of a quantity of the said low-molecular treating agent, under conditions of pressure and temperature at which said agent is in a para-critical state, said quantity being at least 20% by weight of the raffinate phase, said second solvent being introduced into the extraction zone at a temperature below the para-critical temperature of the low-molecular treating agent.

13. A process for separating a mineral hydrocarbon oil having an initial boiling point above 275° C. into several fractions having different properties, comprising the steps of counterflowing in an extraction zone in contact with one another two solvents adapted to form separate layers when in contact with each other and with the oil, the first of said solvents being a preferential solvent for naphthenic oils, and the second solvent being a good solvent for paraffinic oils, bringing said mineral oil into contact with the said counterflowing paraffinic and naphthenic solvents to produce counterflowing extract and raffinate phases, withdrawing extract and raffinate phases at different points in the extraction zone, subjecting the raffinate phase in a normal liquid state at a point between the point of introduction of the oil and the point of introduction of at least a portion of the first solvent to the precipitating action of a low-molecular treating agent which, under treating conditions, is incapable of reacting chemically with the raffinate, under conditions of temperature and pressure at which a quantity of said agent is dissolved in the raffinate phase in a para-critical state, said quantity being at least 40% by weight of the raffinate phase, and the temperature at which the raffinate phase is subjected to the said precipitating action is not higher than 100° C. above the critical miscibility temperature of the first solvent with the most paraffinic component of the oil.

14. The process according to claim 13 in which the low-molecular treating agent is employed as the second solvent, is introduced into the extraction zone in a normal liquid state, and is an aliphatic hydrocarbon having less than seven carbon atoms in the molecule.

OSWALD H. MILMORE.